United States Patent
Lester (10) Patent No.: US 6,734,784 B1
(45) Date of Patent: May 11, 2004

(54) ZERO CROSSING BASED POWERLINE PULSE POSITION MODULATED COMMUNICATION SYSTEM

(76) Inventor: Marshall E. Lester, Powerline Control Systems 19201 Parthenia St., Suite J, Northridge, CA (US) 91324

(*) Notice: Subject to any disclaimer, the term of this patent is extended or adjusted under 35 U.S.C. 154(b) by 217 days.

(21) Appl. No.: 09/656,160

(22) Filed: Sep. 6, 2000

(51) Int. Cl.[7] .......................................... H04M 11/04
(52) U.S. Cl. ...................... 340/310.02; 340/310.01; 340/310.04; 340/310.8; 375/239; 375/259
(58) Field of Search ....................... 340/310.02, 310.03, 340/310.04, 310.01; 375/259, 239

(56) References Cited

U.S. PATENT DOCUMENTS

| | | | | |
|---|---|---|---|---|
| 4,264,960 A | * | 4/1981 | Gurr ........................... 700/295 |
| 4,328,482 A | * | 5/1982 | Belcher et al. ........ 340/310.02 |
| 4,398,178 A | * | 8/1983 | Russ et al. ............. 340/310.02 |
| 4,567,511 A | * | 1/1986 | Smith et al. .................. 725/14 |
| 4,996,513 A | * | 2/1991 | Mak et al. ............. 340/310.04 |
| 5,005,187 A | * | 4/1991 | Thompson .................. 375/340 |
| 5,264,823 A | * | 11/1993 | Stevens ................. 340/310.04 |
| 5,614,811 A | * | 3/1997 | Sagalovich et al. ......... 323/207 |
| 5,691,691 A | * | 11/1997 | Merwin et al. ........ 340/310.02 |

* cited by examiner

*Primary Examiner*—Daniel J. Wu
*Assistant Examiner*—Son Tang
(74) *Attorney, Agent, or Firm*—Allan M. Shapiro (57) ABSTRACT

A transmitting controller is connected to an AC powerline and on command places a series of signal pulse in the powerline in a series of signal timing windows related to zero voltage crossing points so that the signal pulses are in the powerline temporal quiet zone. The receiving controller is connected to the powerline and has a filter circuit therein which filters away the powerline AC signal and noise to leave the sensed pulses. The sensed pulses are compared to zero voltage crossing points to determine in which signal timing window the pulses have occurred. Digital data is communicated over the powerline in accordance with the placement of the signal pulses related to the particular timing window.

32 Claims, 7 Drawing Sheets

ZERO CROSSING BASED POWERLINE PULSE POSITION MODULATED COMMUNICATION SYSTEM

FIELD OF THE INVENTION

This invention is directed to an apparatus which enables digital communication between two or more devices wherein the devices are connected to the same powerline and use the same powerline to receive power and as a physical channel for intercommunication.

BACKGROUND OF THE INVENTION

There are a number of devices which are more conveniently used if they can be remotely controlled. In a household, such devices are mostly appliances and lighting loads. The appliances and lighting loads may be remotely controlled for a number of different reasons. For example, for night security, some lights may be controlled by a timer. In other cases, different lighting intensity and different lighting distribution may be desirable in a single room, depending upon its use. The room may be used for reading, conversation or watching displays, such as television. Each suggest a different lighting level and different lighting distribution. Normally, people do not make such changes because it is inconvenient to do so. Unless there is a convenient way to accomplish it, such adjustment of the lighting system is rarely done. Therefore, it is desirable to have a convenient, reliable way to remotely control lighting systems.

In addition to lighting systems, other devices can be conveniently remotely controlled. For example, powered gates and garage doors can be remotely controlled. An electric coffee pot may be turned on at an appropriate morning hour. Powered draperies may be opened and closed, depending upon sun altitude.

As electronic technology has advanced, inventors have produced a variety of control systems capable of controlling lighting and other electric loads. In order to be useful as a whole-house lighting control system, there are certain requirements that must be met. A system must permit both small and large groups of lights to be controlled on command. The problem is the connection between the controller and the lighting load. Such connection may be hard-wired, but such is complex and very expensive to retrofit into an existing home. Another connection system may operate at radio frequency, but this has proven difficult to implement because the FCC requires low signal levels which are subject to interference and because the transmission and receiving circuitry is complex and expensive.

It must be noted that both the controller and the load to be controlled are connected to the same powerline. It would be useful to use the powerline as the communication-connecting channel. Prior powerline communication schemes have had difficulties employing the powerline as a communication channel because the communication signals after being attenuated by the powerline circuitry are very small compared to the background noise. It is impossible to avoid the fact that between certain locations in a residence there will be very high attenuation of any transmitted signals. It has been difficult to reliably separate the highly attenuated communication signals from the background noise on the powerline.

The situation is further aggravated and complicated by the fact that the noise and attenuation parameters are constantly and unpredictably changing as loads are connected and disconnected both inside the primary residence and inside any of the many neighboring residences attached to the same mains power transformer. In reality the powerline circuit used for communication in a residence includes all the residences attached to the mains power transformer. There is no practical way to avoid the complications caused by this fact.

SUMMARY OF THE INVENTION

In order to aid in the understanding of this invention, it can be stated in essentially summary form that it is directed to a powerline pulse position modulated communication apparatus and method. The transmitting portion of the apparatus senses the zero voltage crossing point in the powerline and transmits a signal pulse in one of a set of specified time windows, the position of the signal pulse-containing window representing digital data in the form of a digital number. The set of all possible window positions is in the quiet zone near to the mains voltage zero crossing point. The receiving circuit also senses the voltage zero crossing point and can reliably detect the signal pulse in the background powerline noise because of the knowledge of where the signal pulse is expected in the time windows near to the zero crossing point and because of the high magnitude of the very robust signal pulse even after significant residential attenuation. After determining in which one of the possible time windows the signal pulse was located the associated digital data in the form of a digital number is easily determined. Thus digital data is communicated from one device through the powerline to another device using this method of powerline pulse position modulation.

It is a purpose and advantage of this invention to provide a method and apparatus for reliable communication of digital data over the powerline by means of a powerline pulse position modulation communication method.

It is a further purpose and advantage of this invention to provide a method and apparatus for powerline pulse communication wherein the voltage zero crossing is sensed and the communication signal pulse is transmitted and sensed in a receiver based on the relative signal window position near to the zero crossing point.

It is a further purpose and advantage of this invention to provide a method and apparatus by a powerline pulse position modulation communication method for the purpose of remote electrical load control.

It is a further purpose and advantage of this invention to provide a method and apparatus by a powerline pulse position modulation communication method for the purpose of remotely retrieving operational data from residential appliances.

It is a further purpose and advantage of this invention to provide a method and apparatus by a powerline pulse position modulation communication method for the purpose of remotely controlling residential loads for utility company energy management.

It is another purpose and advantage of this invention to provide a powerline pulse position modulated communication apparatus and method which complies with FCC regulations relating to apparatus which is connected to and communicating on the powerline.

The features of this invention which are believed to be novel are set forth with particularity in the appended claims. The present invention, both as to its organization and manner of operation, together with further objects and advantages thereof, may be best understood by reference to the following description, taken in conjunction with the accompanying drawings.

DESCRIPTION OF THE PREFERRED EMBODIMENT

Figure 1:
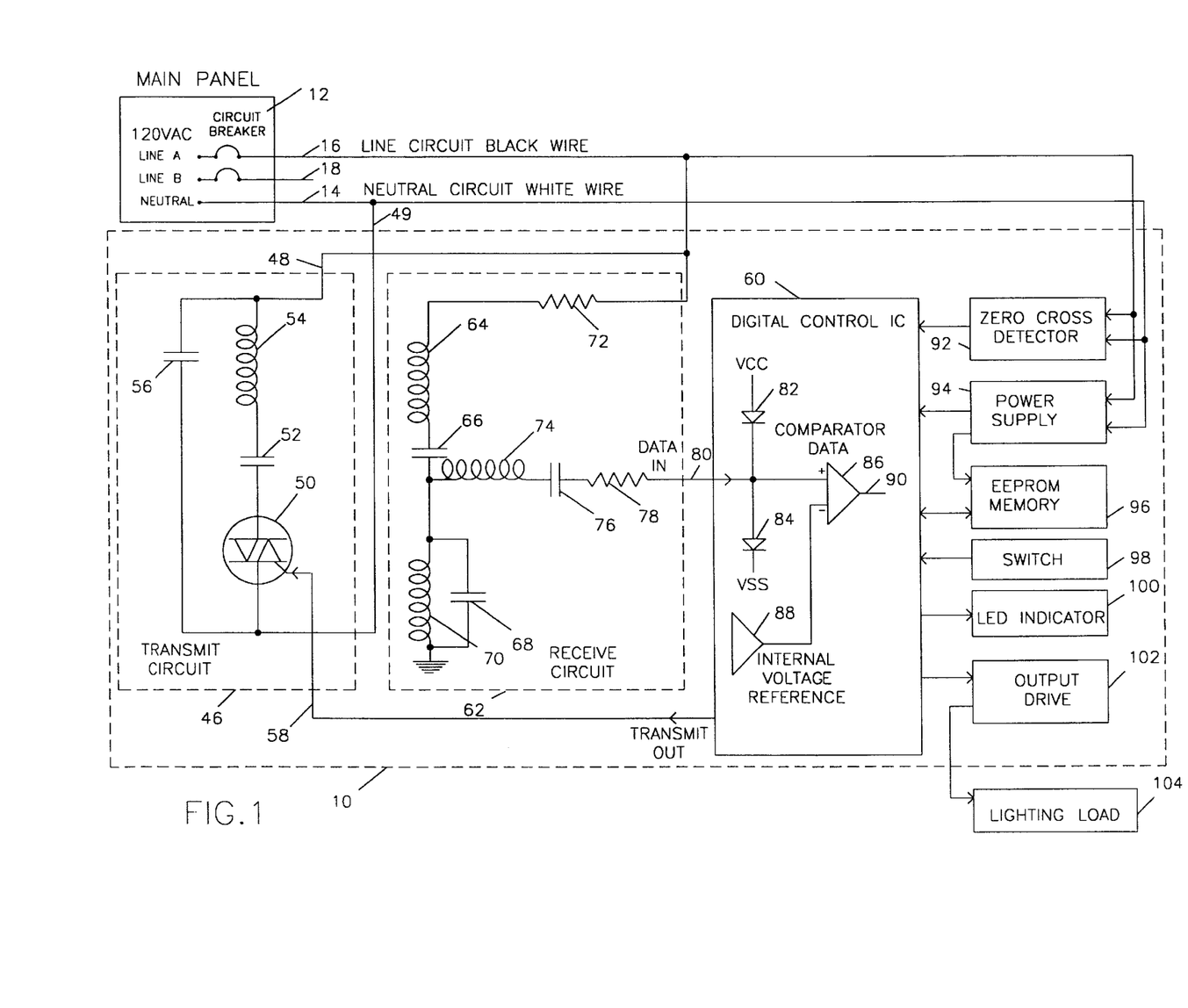
FIG. 1 is a schematic electrical diagram of the powerline pulse position modulated communication apparatus in accordance with this invention.

The purpose of the powerline pulse position modulated communication apparatus of this invention as shown in FIG. 1 is to enable the communication of digital data from one device to another by means of the powerline to which both devices are connected. A further purpose is to enable communication with appliances and to control lighting or other electrical loads in one or more rooms of a residence.

Application Example—Lighting Control System

Figure 2:
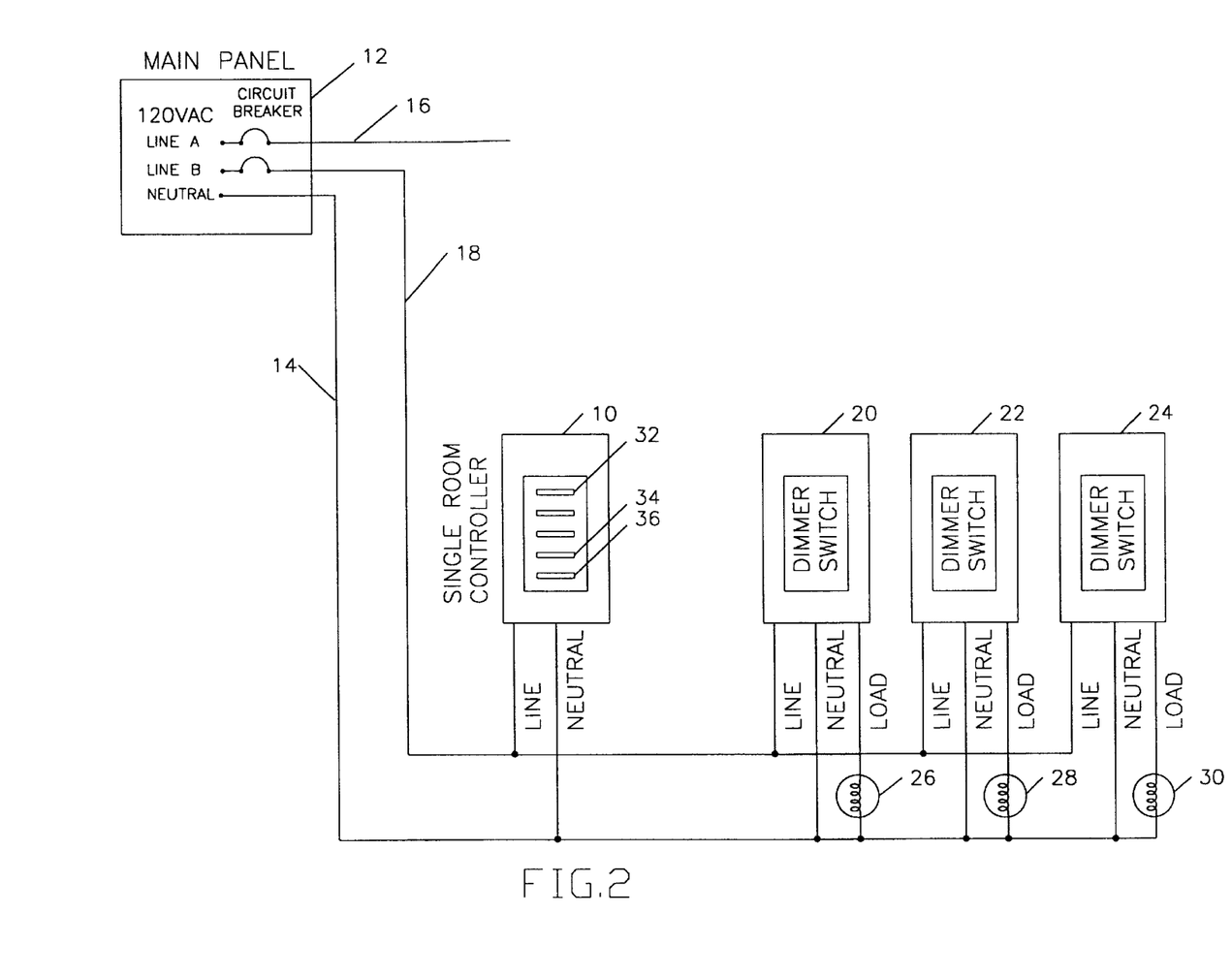
FIG. 2 is a schematic electrical diagram of how a plurality of such apparatus is used to control plural lighting loads in a room.
Figure 3:
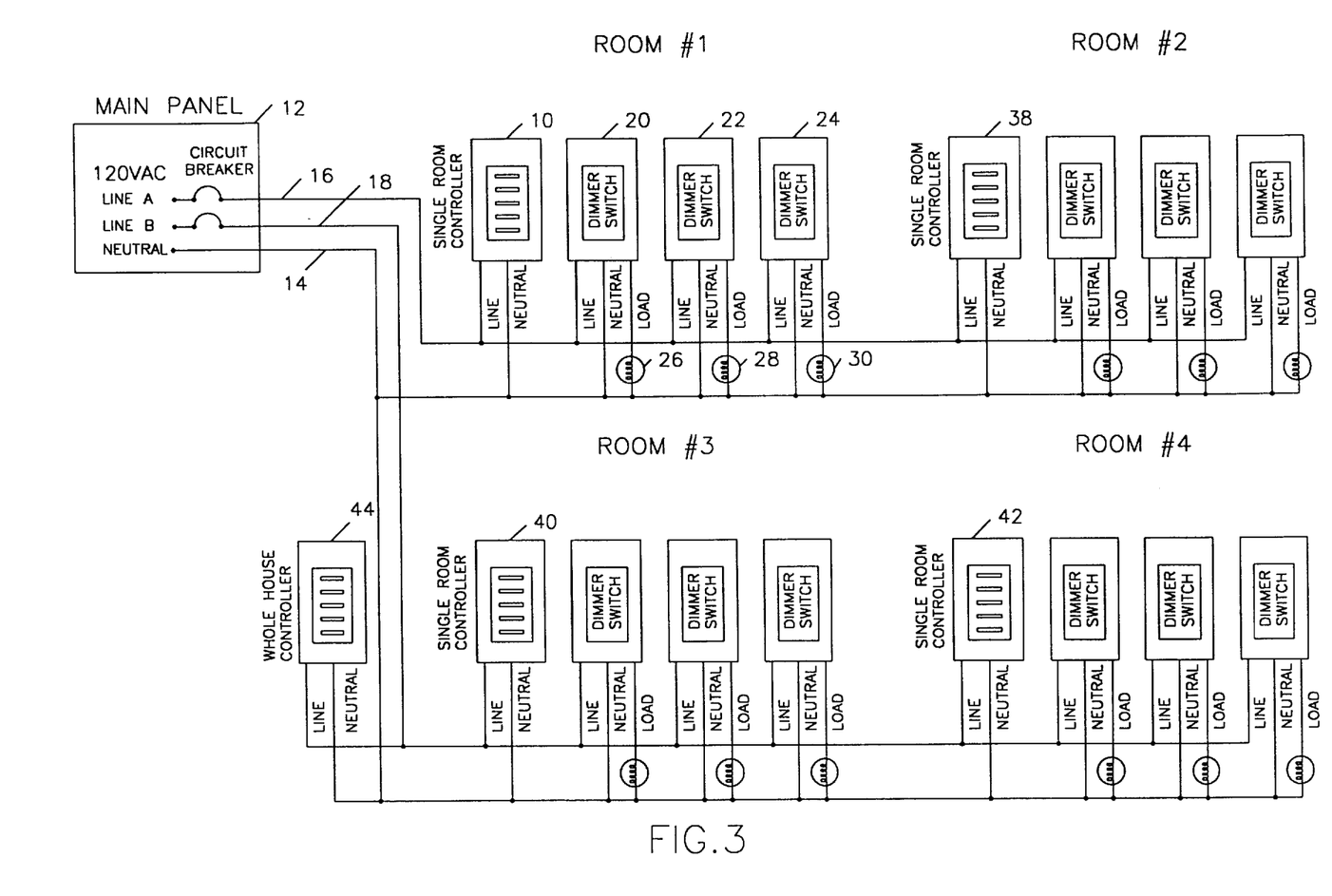
FIG. 3 is a schematic electrical diagram of how a plurality of such apparatus is used to control the lighting load in a plurality of rooms.

A lighting control system as shown in FIG. 2 and FIG. 3 will be used as an example of an application in this description of this invention.

In FIG. 2, transmitting controller 10 is supplied with conventional household electric power from circuit panel 12. Circuit panel 12 is supplied from commercial powerline and has two or three outputs. In the present example, the circuit panel 12 has a neutral line 14 and powerlines 16 and 18. Further, the powerlines 16 and 18 inside a domestic residence are derived from a center tapped 240 vac transformer and are each nominally at 120 rms volts with respect to neutral line 14. The voltage waves in powerlines 16 and 18 are at a 180 degree phase angle with respect to each other.

Also connected to the powerline 18 and neutral 14 are receiving lighting load controllers 20, 22 and 24. These receivers are respectively connected to loads 26, 28 and 30. The loads are electric lights, in this example, but may be heater or motor loads as described above. Furthermore, the receiving controllers 20, 22 and 24 are capable of receiving digital commands which change the supply of power to the loads and may supply different levels of power to the loads to control the brightness of the lighting load. The transmitting controller 10 emits its digital commands into the powerline 18 for transmission to the receiving controllers 20, 22 and 24 by pressing one or more of the command buttons 32, 34 and 36 on transmitting controller 10. Thus, the receiving controllers 20, 22 and 24 receive digital commands from the transmitting controller 10 to respectively control the loads 26, 28 and 30. No separate wiring or radio frequency communication is required, but the transmitting controller places signals in the powerline 18, such transmitted signals being coded so that they can be detected by all of the receiver controllers.

A similar arrangement is seen in FIG. 3 wherein a main circuit panel 12 supplies power to four different rooms. The lighting and other loads in the four different rooms can be separately controlled in each room or can be controlled by a master, whole-house controller 44. Assuming room No. 1 in FIG. 3 is the same as the room in FIG. 2, it is seen that room 2, room 3 and room 4 are identical. Each room has a transmitting controller the same as controller 10 and three receiving controllers, the same as controllers 20, 22 and 24. Each of the receiving controllers controls a load, the same as loads 26, 28 and 30, respectively. Each of the transmitting controllers 38, 40 and 42 is identical to the transmitting controller 10, and each places digital command signals into the powerline. However, the receiving controllers are programmed to act only on the relevant command data. The response of the receivers is determined by the preprogrammed address and command-interpreting program located within each receiver. Thus, the loads in four or more rooms may be respectively controlled by four or more respective transmitting controllers.

In addition, transmitting master controller 44 is connected to the powerline. It is identical to the transmitting controllers 10, 38, 40 and 42, but it is programmed differently to send out digital data signals which command groups of receiving controllers. The fact that transmitting controller 44 is connected only between powerline 18 and neutral 14 does not interfere with its ability and function to send signals to receiving controllers connected between powerline 16 and neutral 14.

Transmission and Receiving Circuit Operation

The transmitting controllers 10 and the receiving controllers 20 are identical, in the sense that they contain the same transmitting and receiving circuitry. They are programmed differently so as to achieve the desired different results. The controller 10 is schematically illustrated in FIG. 1. It has a transmitting circuit 46, which is connected to powerline 16 through line 48 and to neutral through line 49. The transmitting circuit comprises triac 50 which is connected in series with energy storage capacitor 52. Inductor 54 is also in the series connection between line 48 and capacitor 52. Capacitor 56 forms a low pass filter with inductor 54 to minimize high frequency emissions so that the transmitter meets the FCC requirements. Triac 50 is controlled by line 58 which is the output from digital control integrated circuit 60. Hereinafter, the conventional abbreviation "IC" will be used in place of the term "integrated circuit." When the digital control IC sends an appropriate firing signal on line 58, the triac fires and puts a pulse in line 16 with respect to the neutral 14.

Controller 10 also contains a receiver circuit 62. The important components of the receiver circuit 62 form a band pass filter circuit. This includes capacitor 66, capacitor 68, capacitor 76, inductor 70, inductor 74 and inductor 64. Resistor 72 limits the current through the circuit. Resistor 78 is connected in series to limit the current in signal line 80. This circuit filters the signal pulse out of the powerline 60 cycle voltage and background noise.

Signal line 80 is connected into digital control IC 60 as its signal input. As a particular example, digital control IC 60 can be a microprocessor Microchip model PIC16C622. The input signal line 80 is connected between two clipping diodes 82 and 84 to protect the digital control IC 60 from excessively high and low voltages. The signal input line 80 is connected to comparator 86 where the signal voltage is compared to internal voltage reference 88. The comparator 86 allows the digital control IC 60 to automatically adjust the receiving signal level to be set above the noise level. This is a form of automatic gain control which is essential so that the digital control IC 60 can discriminate between noise and real signal pulses. The comparator output 90 carries the received digital signal to the internal processing circuitry of the digital control IC.

There are additional inputs to the digital control IC 60. Zero crossing detector 92 is connected to powerline 16 and neutral 14. It has an output to the digital control IC 60. Power supply 94 supplies power to the digital control IC and to the EEPROM memory 96. There may be a plurality of the input switches, one of which is indicated at 98, for causing the digital control IC 60 to perform some internal operation or to issue transmitted commands. The commands of switch 98 correspond to the command buttons 32, 34 and 36 seen in FIG. 2. It is desirable that there be some method of visual feedback to the user for a variety of programming and control uses. This is provided by indicator light 100, which may be energized by the digital control IC 60. When the controller 10 is acting as a receiver load controller, it has an output circuit which controls the load. This output device 102 is in the form of a relay, triac, or the like. It controls the flow of power from line 16 to the load 104.

Pulse Position Modulation of Digital Data

Figure 4A:
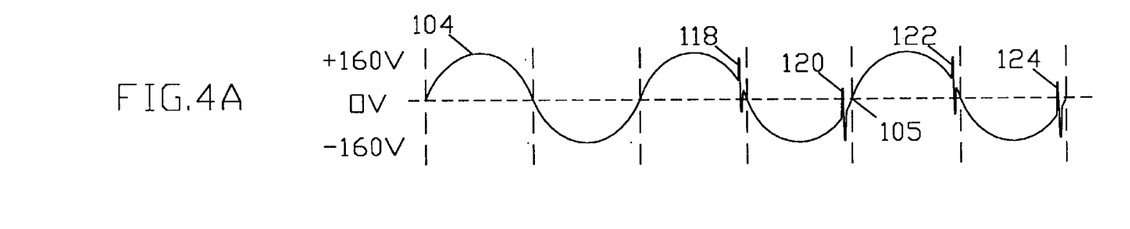
FIGS. 4A, 4B, 4C and 4D show the powerline waveforms containing the communication signals therein as utilized by this invention.
Figure 4B:
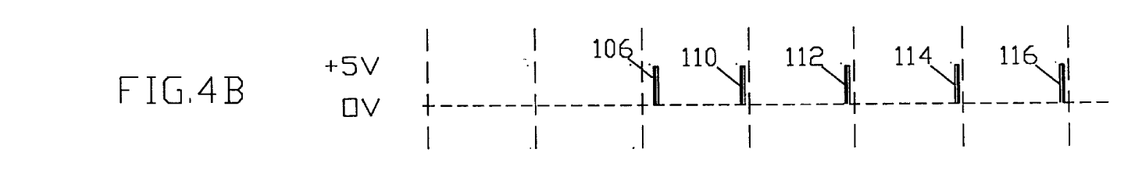

FIG. 4A shows a sine wave 104 which represents the powerline voltage in one of the lines 16 or 18 of FIG. 2, as compared to neutral. Six half cycles are shown. For the purpose of this disclosure, the powerline frequency is 60 cycles per second, which is the modern domestic standard. The voltage shown is nominally 120 volts rms, with peaks at about 160 volts, plus and minus.

Transmitter Operation

In FIG. 4A, the voltage through the time periods T1 and T2 is a plain sine wave. During the next four half cycles, T3, T4, T5 and T6, there is a superimposed pulse on the sine wave near to the zero crossing point 105. In FIGS. 4A, 4B, 4C and 4D, the zero crossing point is represented as the transition from one time period to the next. These superimposed pulses are the means of communication. The transmitting device places these pulses on the powerline. Receiving devices detect these pulses on the powerline.

Figure 5:
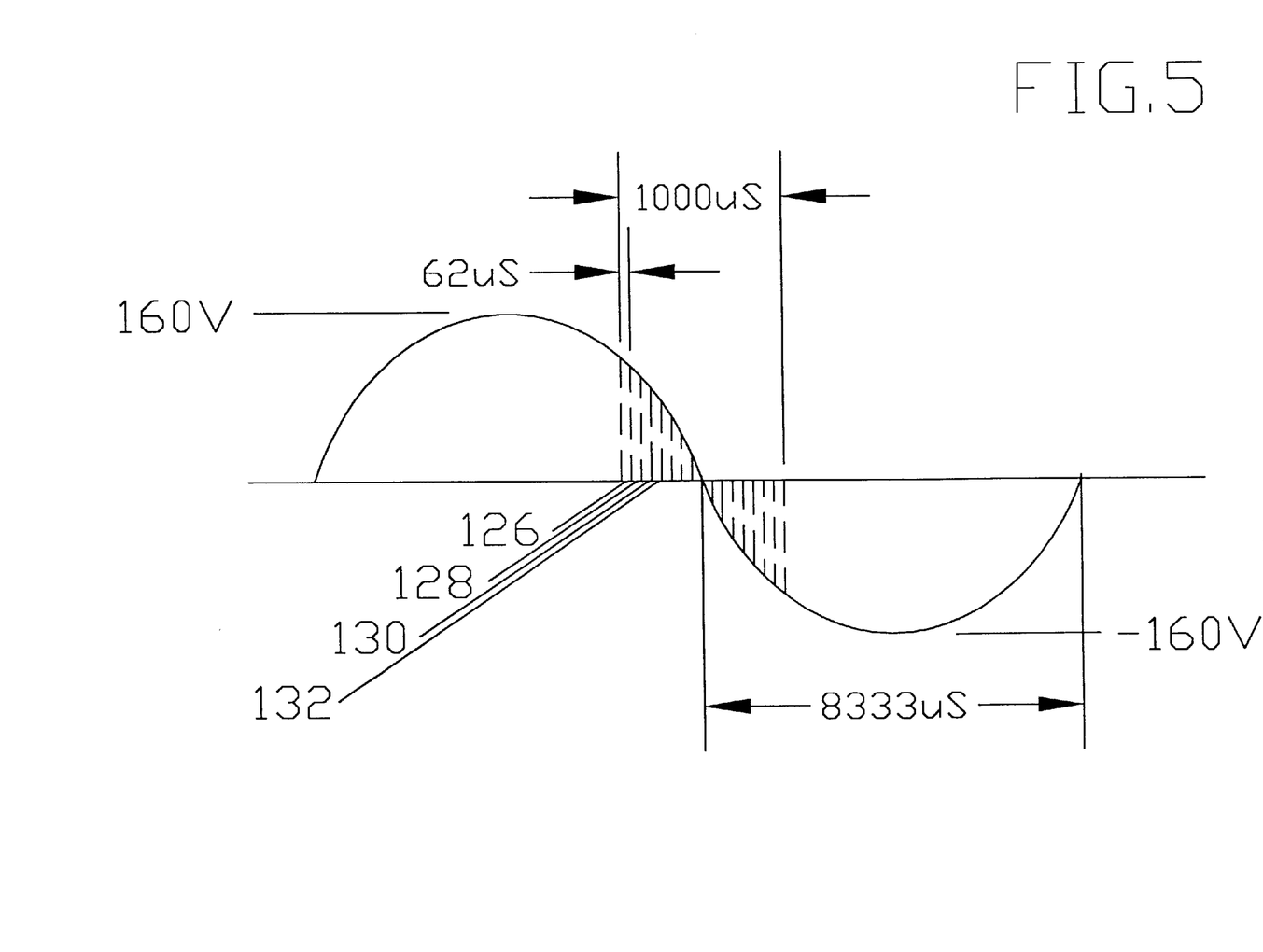
FIG. 5 is a powerline waveform diagram showing the communication windows employed by the apparatus of this invention.

Each pulse represents one transmitted number. The number transmitted can range from 1 to N where N is the total number of window positions. In FIG. 5 a sine wave is shown with the sixteen windows highlighted. Windows number 0, 1, 2, and 3 are identified on FIG. 5 as 126, 128, 130, and 132, respectively. The current embodiment uses sixteen windows, eight before and eight after zero crossing. With sixteen possible positions, one numeric digit, from 0 to 15, can be transmitted every half cycle. In binary, this is equal to four bits per half cycle. Up to 256 windows are possible with current technology. In binary, a number with 256 possible states is equal to eight bits or one byte per half cycle.

Figure 4C:
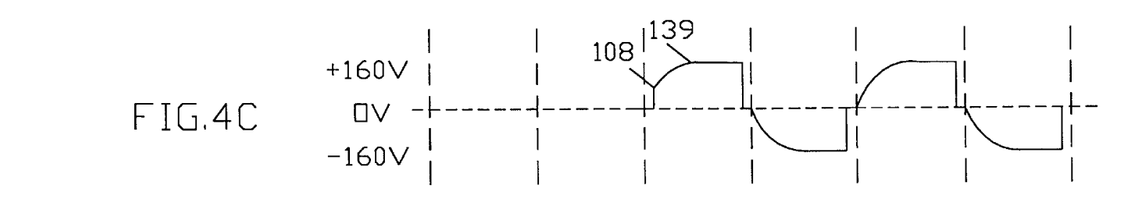
Figure 4D:
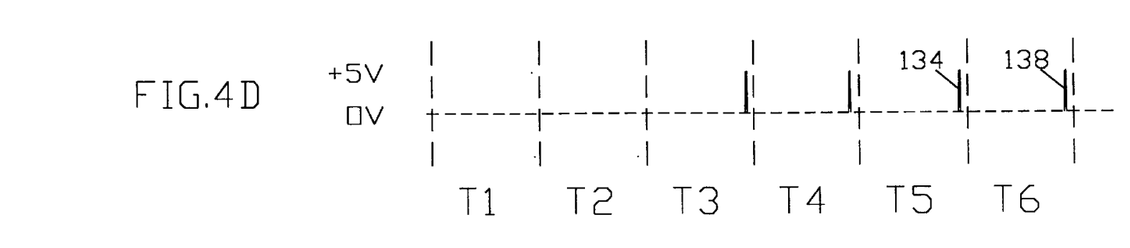

When a powerline pulse is desired, the first need is to charge the capacitor 52 in FIG. 1. Before the initial charging the initial charge state of the capacitor 52 is unknown. The digital control IC puts an initial trigger pulse 106, see FIG. 4B, in line 58 to begin charging triac 50. The initiating pulse is preferably near a zero crossing but is not critical. This turns on the triac 50, and the capacitor 52 begins charging. FIG. 4C shows the voltage across capacitor 52, and the start of its charging is shown at point 108. The curve in FIG. 4C after the point 108 is the traditional capacitor charging curve. This does not yet produce a pulse in the powerline. Once the triac 50 is conductive, another initiating trigger pulse is not necessary. Once the triac is charged and discharged in one half cycle, it will continue to charge in the opposite polarity and will be ready to discharge in the next half cycle, as seen in FIG. 4C. The triac turns off and the capacitor stops charging each time the charging current through the triac 50 reaches zero, which occurs at every peak of the mains sine wave, one of which is shown as 139 in FIG. 4C. When it is desired that a signal pulse be placed on the powerline, digital control IC 60 places a trigger pulse in line 58 to fire triac 50. These trigger pulses are shown at 110, 112, 114 and 116 in FIG. 4B. These pulses produce conduction in triac 50 to create corresponding signal pulses 118, 120, 122 and 124 in the powerline, as shown in FIG. 4A. The waveform in FIG. 4C is shown as a reference of the voltage across transmitting capacitor 52 as it is charged and discharged. As it is discharged every half cycle, a pulse is produced in the powerline.

It is the position of the pulse relative to zero crossing which determines what digit has been encoded in that pulse. In the example in FIG. 6 there are 16 windows or possible positions every half cycle. Using programming numbering conventions the first four windows may be labeled Window #0, Window #1, Window #2 and Window #3. These windows are shown as 126, 128, 130, and 132 in FIG. 5 and FIG. 6. Because only one pulse can be produced every half cycle, the pulse may be placed in only one of the sixteen windows. If there are 16 windows then one and only one of the digits 0 to 15 may be encoded by the position of the pulse. If the pulse is located in window #0 as shown as 122 cycle T5 in FIG. 6A, then the digit 0 is being transmitted. If the pulse is located in window #3 as shown as 124 cycle T6 in FIG. 6A, then the digit 3 is being transmitted. Since only one pulse can be transmitted per half cycle with this circuit design, one and only one number can be transmitted each half cycle. The reason this method of modulating data is called "pulse position modulation" herein is because the value of the data is encoded in the position of the pulse.

Figure 6A:
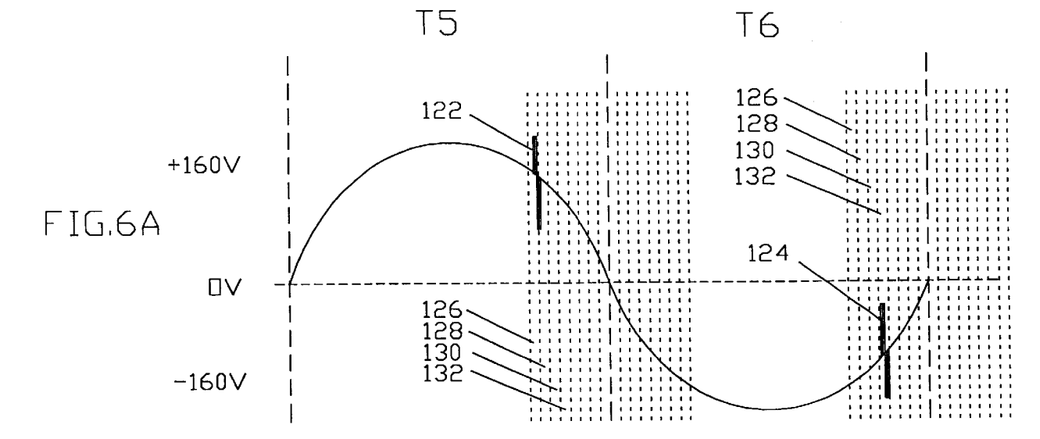
FIGS. 6A to 6C show the powerline waveforms and the associated communication windows related to zero voltage crossing, and show signals in some of the windows.

Because of attenuation, background noise, and other periodic and intermittent random pulses present on the powerline, these signal pulses would ordinarily be difficult to detect. However, in accordance with this invention, when the pulse is located near the zero voltage crossing point for the power voltage wave, there is a quiet zone in the powerline voltage waveform in which the signal pulse can be more reliably detected. FIG. 5 shows two alternate half cycles of the normal 60 cycle sine wave. There are 8333 microseconds between zero crossings. The quiet zone close to each zero crossing is about 500 microseconds long on each side of the zero crossing. The total quiet zone is about 1000 microseconds long. Dividing this quiet zone into sixteen windows defines eight 62 microsecond windows located on each side of the zero crossing. The duration of each window is a function of how precise the transmitting and receiving timing can be accomplished. Smaller times will result in greater errors which results in lower overall reliability. While 16 windows are shown in FIG. 5, in actuality 256 windows are feasible with current IC technology. Signal windows 126, 128, 130 and 132 are shown in FIG. 5. The same windows 126, 128, 130 and 132 are shown in FIG. 6A.

In the example shown in FIG. 5 and FIG. 6, there are sixteen signal windows near to each zero crossing. Present technology permits defining windows as small as 4 microseconds wide so that 256 windows can be defined near to each zero crossing.

Receiver Operation

The manner of operation of this receiving circuit 62 in FIG. 1 has been discussed above. It is connected to the line and awaits the incoming pulse. The powerline frequency and noise are filtered out, but the signal pulse can readily be detected because it is within the 1000 microsecond quiet zone near the zero crossing point. When the pulse is sensed, the signal window in which it is located with respect to the zero crossing point is determined by the digital control IC 60. The sensed pulses 134 and 138 are seen in FIG. 6C. These correspond to the position with respect to the zero crossing as represented by the signal pulses 122 and 124 on the powerline wave in FIG. 6A.

FIG. 6A illustrates two half cycles on the powerline sine wave. Signal pulse 122 is produced on the powerline sine wave at a time X1 after the zero crossing at the beginning of T5 and before or after the zero crossing at the beginning of T6, and this results in a sensed signal 134 in the receiving circuit. Signal pulse 138 is sensed at a different time X2 before or after the zero crossing point at the beginning of T7.

Figure 6B:
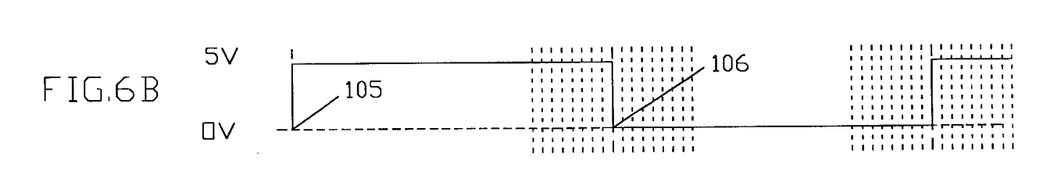
Figure 6C:
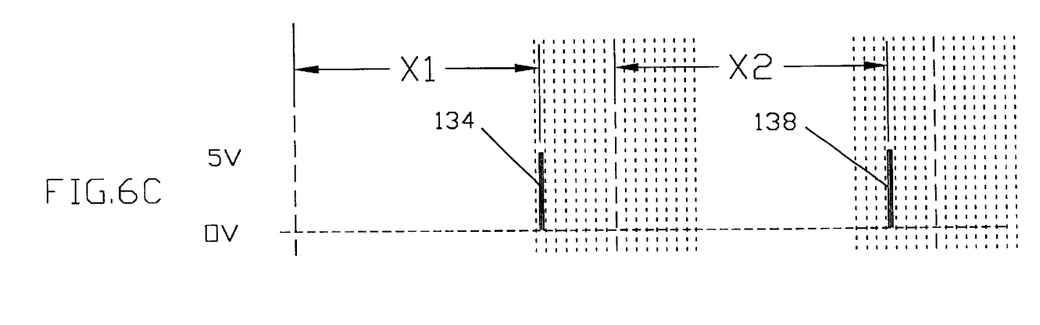
Figure 7:
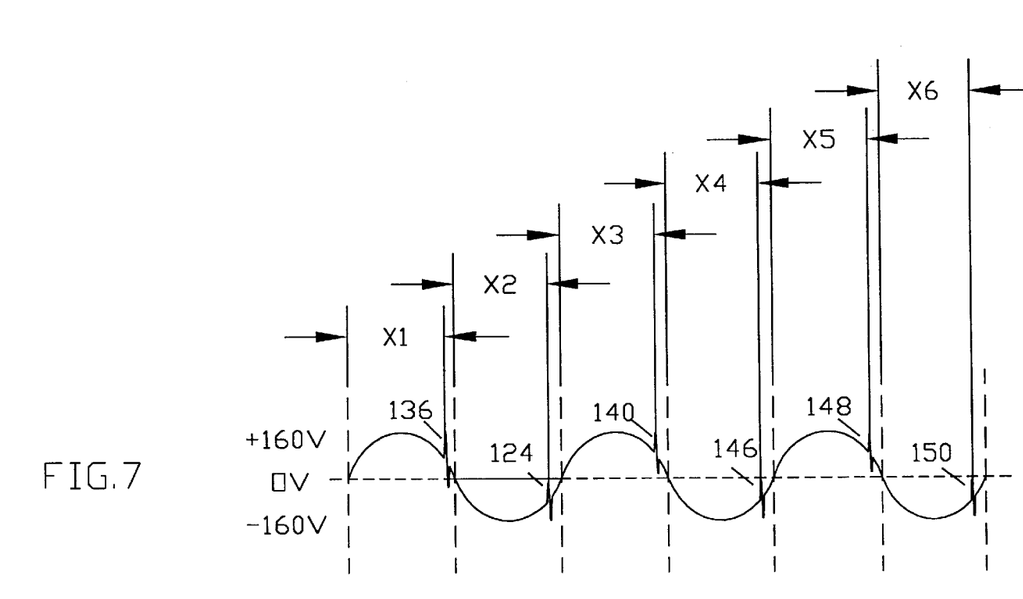
FIG. 7 shows the signal location in the powerline for a particular signal.
Figure 8:
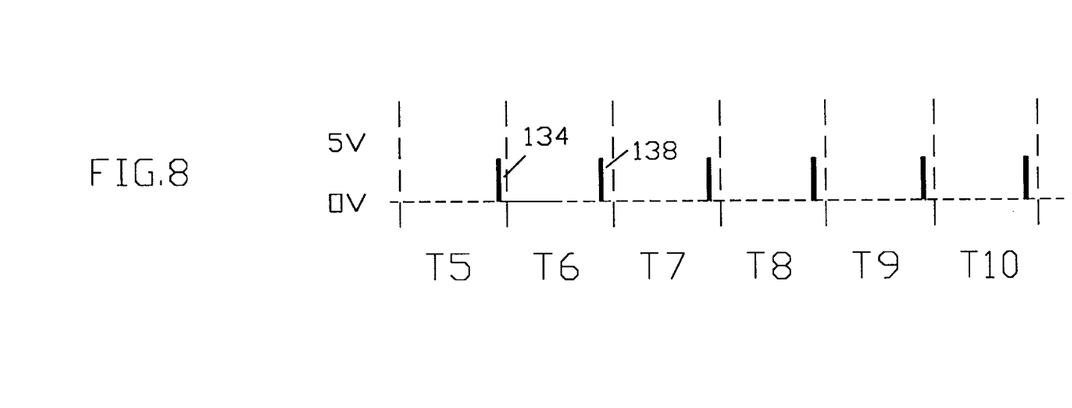
FIG. 8 shows the corresponding signal after it is extracted from the powerline wave.

FIG. 6B shows the zero crossing timing signal that is fed into the digital control IC by the zero crossing detector circuit 92 in FIG. 1. The transition of the signal in FIG. 6B from low to high at 105 or high to low at 106 marks the position of the zero crossing point to the digital control IC.

FIG. 6C shows the timing position of each of these pulses with respect to zero crossing. These pulses are in line 80 into the digital control IC which compares their timing with respect to the signal received from the zero crossing detector 92.

These times, shown as X1 and X2 in FIG. 6C, can be processed to determine in which one of the sixteen possible different windows the pulse was located. Each consecutive half cycle passes the window position containing the signal pulse as determined by the receiving digital control IC. As the window position is determined, the appropriate decoded numerical digit is also determined. Each one of the time measurements, X1 and X2, are translated into a digit from 0 to 15 by the digital control IC. As shown in FIG. 6C, the value of X1 can be used by the digital control IC to calculate that the pulse 134 is in window #0. Similarly, as shown in FIG. 6C, the value of X2 can be used by the digital control IC to calculate that the pulse 138 is in window #3. The internal program in the digital control IC will interpret these pulses 134 and 138 as the transmission of the two numerical values 0 and 3. This is the fundamental method of transmitting and receiving numerical data. This series of numerical data is stored in the digital control IC and processed according to the application program requirements. If the device is a lighting controller, the data would most likely represent lighting system addresses and command instructions. Other applications would have other meanings for the decoded data. Some application devices such as a powerline modem might use the invention for pure communication of data and may not have a specific application function.

This invention has been described in its presently contemplated best mode, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A powerline pulse position modulated communication transmitter comprising:

first and second connections for connecting to an AC powerline;

a chargeable capacitor and a switch in series therewith coupled to said first and second connections for connection in parallel to the powerline;

a digital control IC;

a zero voltage crossing detector circuit coupled to said first and second connections and to said connected to said digital control IC; and a signal source to actuate said digital control IC, said digital control IC being coupled to said switch in series with said capacitor to actuate said switch in one of a predetermined number of a plurality of signal timing positions referenced to the zero voltage crossing time and located within a predetermined time range after the peak of the cycle but before the zero voltage crossing time and not at the zero voltage crossing time to discharge said capacitor into the powerline to produce a signal pulse in the powerline in said one of said signal time positions.

2. The powerline pulse position modulated communication transmitter of claim 1 wherein there is a memory connected to said digital control IC, said memory being organized to cause said digital control IC to provide an appropriate series of said signal pulses representing digitally encoded data in response to said signal source to actuate said digital control IC.

3. The powerline pulse position modulated communication transmitter of claim 1 wherein said switch in series with said capacitor is a triac and said triac is connected to be actuated by said transmitting digital control IC so that said triac permits charging of said capacitor in either polarity of the powerline.

4. The powerline pulse position modulated communication transmitter of claim 3 wherein said digital control IC is programmed to actuate said triac to permit charging of said capacitor before signal pulses are desired, in order to have a charge on said capacitor when an actuating pulse actuates said triac to cause a signal pulse in the powerline in a selected signal window.

5. The powerline pulse position modulated communication transmitter of claim 1 wherein said digital control IC senses voltage zero crossing in the powerline and emits actuating pulses to said switch to cause signal pulses in signal timing positions referenced to the zero voltage crossing time and located within a predetermined time range after the peak of the cycle but before the zero voltage crossing time and not at the zero voltage crossing time.

6. The powerline pulse position modulated communication transmitter of claim 5 wherein there are at least two signal timing positions within said predetermined time range after the peak of the cycle but before the zero voltage crossing time and not at the zero voltage crossing time.

7. The powerline pulse position modulated communication transmitter of claim 1 wherein said transmitter is one of two controller parts of a system, both said controller parts being connectable to the same powerline for communication therebetween on the powerline, said system comprising two controllers, one acting as said transmitting controller and the other acting as a receiving controller, each said transmitting controller and said receiving controller respectively containing a transmitting digital control IC and a receiving digital control IC and each having a zero voltage crossing detector circuit connected thereto, and each said controller having both a transmitting circuit and a receiving circuit so that either said controller can act as a transmitting controller or as a receiving controller, utilizing the same digital control IC.

8. The powerline pulse position modulated communication apparatus of claim 7 wherein each said controller has a transmitting circuit comprised of a triac serially connected to a capacitor, said serially connected triac and capacitor being coupled to the powerline, said triac being coupled to be controlled by said digital control IC; and each said apparatus having a receive circuit comprising a filter circuit for connection to the powerline, said filter having an output signal line connected to said digital control IC so that said digital control IC can detect the timing of a signal pulse with respect to the zero voltage crossing.

9. The powerline pulse position modulated communication system of claim 8 wherein a memory is connected to said digital control IC, said memory being programmed to define signal timing positions referenced to the zero voltage crossing time and located within a predetermined time range after the peak of the cycle but before the zero crossing time and not at the zero crossing time so that said transmitting digital control IC can transmit a pulse to the powerline in a selected signal timing position when acting as a transmitter, and said receiving digital control IC can determine in which signal timing position a signal pulse occurs when said apparatus is acting as a receiving controller.

10. The powerline pulse position modulated communication transmitter of claim 1 wherein there is an output driver connected to said digital control IC, said output driver being connectable to a load so said output driver can be actuated to energize the load.

11. A powerline pulse position modulated communication receiver comprising:
    first and second connections for connecting to an AC powerline;
    a digital control IC,
    a filter circuit coupled to said first and second connections for filtering out AC power voltages and passing signal pulses, said digital control IC being connected to said filter circuit to receive signal pulses passed by said filter circuit; and
    a zero AC voltage crossing detector circuit coupled to said first and second connections and to said digital control IC, said digital control IC being programmed to compare the timing of the signal pulses to the timing of the zero voltage crossing times to determine in which one of a plurality of signal timing positions the signal pulse is in, said digital control IC deriving an encoded digital data number from the position of said pulse being located in said one of said plurality of possible said timing positions.

12. The powerline pulse position modulated communication receiver of claim 11 wherein said digital control IC senses signal pulses only in predetermined signal timing positions referenced to the zero voltage crossing time and located within a predetermined time range after the peak of the cycle but before the zero voltage crossing time and not at the zero voltage crossing time.

13. The powerline pulse position modulated communication receiver of claim 12 wherein there are at least two signal timing positions referenced to the zero voltage crossing time and located within a predetermined time range after the peak of the cycle but before the zero voltage crossing time and not at the zero voltage crossing time.

14. The powerline pulse position modulated communication receiver of claim 11 wherein said apparatus is one of two parts of a system, both being connectable to the same powerline for communication therebetween on the powerline, said system comprising two of said apparatus, one acting as a transmitting controller and the other acting as a receiving controller, each said transmitting controller and said receiving controller respectively containing a digital control IC which can be programmed to act as a transmitting digital control IC or a receiving digital control IC, each said apparatus having a zero voltage crossing detector circuit connected thereto, and each said apparatus having both a transmitting circuit and a receiving circuit so that either said apparatus can act as a transmitting controller or as a receiving controller, utilizing the same digital control IC.

15. The powerline pulse position modulated communication receiver of claim 11 wherein said received signal pulses are received by a circuit incorporating a means of automatically adjusting the receive detection voltage level to provide automatic gain control.

16. A powerline pulse communication apparatus comprising:
    a transmitting controller and a receiving controller, said transmitting controller and said receiving controller each having connections for connecting to an AC powerline;
    said transmitting controller having a zero voltage crossing detector circuit with connections for connecting to the AC powerline, said transmitting controller having a digital control IC therein, said zero voltage crossing detector circuit having an output connected to said digital control IC;
    a command input means connected to said digital control IC so that when said command input means is actuated said digital control IC emits a trigger signal;
    a serially connected switch and capacitor having connections for coupling to the AC power supply so that, when said switch is actuated, said capacitor is charged by the AC power supply, said switch being connected to receive a trigger signal from said digital control IC, said digital control IC being programmed so that the trigger signal comes on within one of a plurality of temporal signal timing positions referenced to the zero voltage crossing time and located within a predetermined time range after the peak of the cycle but before the zero voltage crossing time and not at the zero voltage crossing time so that said capacitor is discharged and the signal pulse is added to the powerline within said temporal signal timing positions located within said predetermined time range after the peak of the cycle but before the zero voltage crossing time and not at the zero voltage crossing time.

17. The powerline pulse communication apparatus of claim 16 wherein said digital control IC is programmed to turn on said switch at a time to produce the powerline pulse within one of a plurality of said predetermined temporal signal timing positions referenced to the zero voltage crossing time and located within a predetermined time range after the peak of the cycle but before the zero voltage crossing time and not at the zero voltage crossing time.

18. The powerline pulse communication apparatus of claim 17 wherein there are at least two temporal positions separately defined by said digital control IC within the quiet zone within 1200 microseconds of zero voltage crossing.

19. The powerline pulse communication apparatus of claim 18 wherein each of said temporal positions is approximately at least 100 microseconds long.

20. The powerline pulse communication apparatus of claim 16 wherein said receiving controller also has a zero voltage crossing detector circuit and a receiving digital control IC, said zero voltage crossing detector circuit being connected to said receiving digital control IC;
    a filter circuit having connections for connection to the household powerlines to receive power signals and communication pulses superimposed therein by a transmitting controller, said filter circuit substantially filtering out all signals except any command pulse in the powerline, said filter circuit being connected to said receiving digital control IC, said receiving digital control IC being programmed to be sensitive only to signal pulses within said predetermined time range after the peak of the cycle but before the zero voltage crossing time and not at the zero voltage crossing time.

21. The powerline pulse communication apparatus of claim 20 wherein said receiving digital control IC is programmed to distinguish between different temporal positions within said predetermined time range near to but not at the zero voltage crossing time.

22. The powerline pulse communication apparatus of claim 21 wherein said transmitting digital control IC is programmed to turn on said switch at a time to produce the powerline pulse within one of several signal timing positions referenced to the zero voltage crossing time and located within a predetermined time range after the peak of the cycle but before the zero voltage crossing time and not at the zero voltage crossing time.

23. The powerline pulse communication apparatus of claim 21 wherein there are at least two possible temporal signal timing positions referenced to the zero voltage crossing time and located within a predetermined time range after the peak of the cycle but before the zero voltage crossing time and not at the zero voltage crossing time.

24. The powerline pulse communication apparatus of claim 21 wherein each of said temporal positions is approximately 100 microseconds long.

25. The powerline pulse communication apparatus of claim 20 wherein there is an output controller connected to said receiving digital control IC and said output controller is for connection to the AC powerline and to an electrical load, said output controller turning on said load when said receiving digital control IC detects pulses in said powerline corresponding to a command to energize the load.

26. The powerline pulse communication apparatus of claim 25 wherein said receiving digital control IC is programmed to distinguish between different signal timing positions referenced to the zero voltage crossing time and located within a predetermined time range after the peak of the cycle but before the zero voltage crossing time and not at the zero voltage crossing time.

27. A powerline pulse position modulated communication method for remotely controlling a load, comprising the steps of providing a transmitting controller for connection to an AC powerline;

sensing zero voltage crossing in the AC powerline;

sensing a load control command and causing transmission of a series of actuating pulses related to the zero voltage crossing sensing and the load control command;

discharging a capacitor across the powerlines in response to the actuating pulses in a series of selected signal timing positions referenced to the zero voltage crossing time and located within a predetermined time range after the peak of the cycle but before the zero voltage crossing time and not at the zero voltage crossing time;

sensing at a receiving controller the zero voltage crossing, sensing the signal pulses and determining in which signal timing positions as compared to zero voltage crossing the signal pulses occurred; and actuating the load depending upon in which signal timing windows positions the pulses occurred.

28. The method of claim 27 wherein the discharging of the capacitor to place a pulse in the powerline is caused by actuating a triac to become conductive with the triac-actuating signal being produced by a transmitting controller digital control IC.

29. The method of claim 28 wherein the timing of the trigger pulses to the triac are related to the zero crossing times by discharging the capacitor in a series of signal timing positions within said predetermined time range after the peak of the cycle but before the zero voltage crossing time and not at the zero voltage crossing time which correspond to a command for load control.

30. The method of claim 29 wherein the signal timing positions are approximately 100 microseconds wide.

31. The method of claim 27 wherein the receiving controller filters the signal out of the powerline voltage adjacent the zero voltage crossing where the powerline is most quiet and delivers a series of sensed signal pulses to the digital control IC which determines in which signal timing positions said series of pulses occurred.

32. The method of claim 31 wherein the sensing in which signal timing positions the series of pulses occurred is correlated with a load command to appropriately actuate the load.

* * * * *